United States Patent
Erb et al.

(10) Patent No.: US 9,008,683 B2
(45) Date of Patent: Apr. 14, 2015

(54) CALL LOCALIZATION SYSTEMS AND METHODS

(75) Inventors: Paul Andrew Erb, Ottawa (CA); Peter Hillier, Ottawa (CA)

(73) Assignee: Mitel Networks Corporation, Ottawa, Ontario (CA)

(*) Notice: Subject to any disclaimer, the term of this patent is extended or adjusted under 35 U.S.C. 154(b) by 0 days.

(21) Appl. No.: 12/928,834

(22) Filed: Dec. 20, 2010

(65) Prior Publication Data
US 2012/0157112 A1 Jun. 21, 2012

(51) Int. Cl.
*H04W 24/00* (2009.01)
*H04M 3/54* (2006.01)
*H04M 3/42* (2006.01)

(52) U.S. Cl.
CPC ............ *H04M 3/54* (2013.01); *H04M 3/42093* (2013.01); *H04M 3/4211* (2013.01); *H04M 3/42153* (2013.01); *H04M 3/42263* (2013.01); *H04M 3/42357* (2013.01); *H04M 2203/1091* (2013.01); *H04M 2207/18* (2013.01); *H04M 2242/30* (2013.01); *H04M 2250/10* (2013.01)

(58) Field of Classification Search
CPC .................. H04L 29/08108; H04L 2012/5607; H04M 3/42042; H04M 3/56; H04M 1/575; H04M 9/001; H04M 3/54; H04M 3/58; H04W 4/16; H04W 8/245; H04W 8/14; H04W 80/04; H04W 84/12
USPC .............. 455/414.1, 415, 416, 417, 418, 466, 455/456.1–457; 370/310.2, 328, 338; 379/142.1, 171–173, 211.02–212.01
See application file for complete search history.

(56) References Cited

U.S. PATENT DOCUMENTS

| | | | |
|---|---|---|---|
| 5,506,888 A * | 4/1996 | Hayes et al. ................. 455/445 |
| 5,530,931 A * | 6/1996 | Cook-Hellberg et al. ......................... 379/211.03 |
| 5,724,417 A * | 3/1998 | Bartholomew et al. ... 379/211.05 |
| 6,295,447 B1 * | 9/2001 | Reichelt et al. ............... 455/417 |
| 6,584,316 B1 * | 6/2003 | Akhteruzzaman et al. ... 455/445 |
| 6,597,781 B2 * | 7/2003 | Schwab et al. ........... 379/211.02 |
| 7,006,833 B1 | 2/2006 | Contractor |
| 7,047,019 B1 * | 5/2006 | Cox et al. .................... 455/456.1 |
| 7,058,415 B2 * | 6/2006 | Bushnell et al. .............. 455/461 |
| 7,242,680 B2 * | 7/2007 | Gallant ......................... 370/352 |
| 7,450,935 B1 * | 11/2008 | Link et al. ..................... 455/417 |
| 2007/0043687 A1 * | 2/2007 | Bodart et al. ...................... 707/1 |
| 2008/0051066 A1 * | 2/2008 | Bandhole et al. ............. 455/413 |
| 2009/0028318 A1 | 1/2009 | Bhogal et al. |
| 2009/0323919 A1 | 12/2009 | Toner et al. |

FOREIGN PATENT DOCUMENTS

EP    1534036 A2    5/2005

* cited by examiner

*Primary Examiner* — Steve D Agosta

(57) ABSTRACT

Described are a system and method of managing a real-time communication initiated to a mobile communications device. A communication from an originating communications device is sensed as being directed to a first destination address corresponding to a mobile communications device. Location information of the mobile communications device is determined. The communication is directed to a second destination address based on the determined location of the mobile communications device.

7 Claims, 8 Drawing Sheets

CALL LOCALIZATION SYSTEMS AND METHODS

FIELD OF THE INVENTION

The specification relates generally to communications systems, and specifically to systems and methods for managing calls initiated to a mobile communications device based on the location of the mobile communications device.

BACKGROUND

The recent emergence of mobile phones and services permit users to communicate even while traveling between locations. Modern mobile phones are configured with many features that allow users to stay in communication regardless of their location. A popular feature used by mobile phone users is call forwarding, which permits an incoming call to a mobile phone to be directed to another phone, for example, an office phone, home phone, or a hotel phone. Another feature offered by Mitel Networks Corporation of Ontario, Canada, is Dynamic Extension, which allows a user to configure a personal ring group (PRG) of several phones that can all ring simultaneously when a call is placed to a single phone number. For example, as shown in FIG. 1, a call 110 initiated by an originating telephone 102 to a destination telephone 106 can be intercepted by a communications server 108, for example, a Mitel® 3300 Integrated Communications server (ICP). The communications server 108 can direct 112 the incoming call to the destination telephone 106, and also forward 114 the incoming call to a mobile phone 104, which is configured as a member of the PRG.

While these features permit a mobile phone user to be accessible regardless of location, the service costs associated with mobile phone use can be expensive, especially if the mobile phone is used outside the local coverage area defined in the user's mobile phone service plan. In addition, when an incoming call fails in delivery to a destination mobile phone, the call is typically rerouted to a voicemail service, often without awareness by the user of the incoming call. The mobile phone user can incur additional charges for calls made to voicemail.

To address these issues, some mobile phone users rely on a multi-mode mobile phone with satellite capability and subscribe to a plan with a service provider that reduces the additional expense involved with calls outside the coverage area. Such service plans can be expensive.

Mobile phone users may replace the subscriber identity module (SIM) in the mobile phone, to change the coverage area to include the region where they are currently located. However, this approach requires careful planning as well as manual replacement of the SIM by the user, which can result in damage to the SIM or the mobile phone. Improper replacement of a SIM can also result in additional toll charges.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

DETAILED DESCRIPTION OF EXAMPLE EMBODIMENTS

Figure 1:
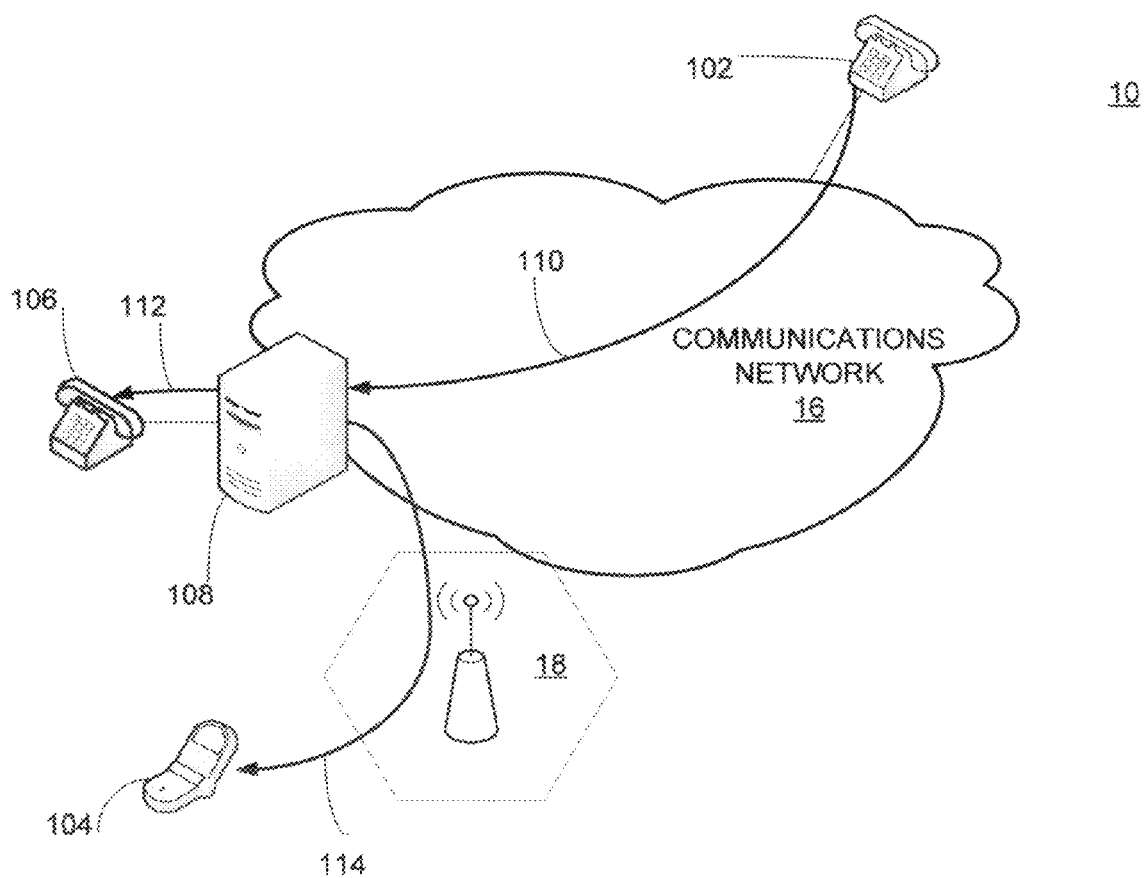
FIG. 1 is an illustration of a conventional network environment for telephonic communication.

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It should be understood that many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

A storage device can include a computer readable storage medium, which may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

In brief overview, systems and methods are disclosed that determine a destination address, for example, a phone number, for an incoming phone call to a mobile communications device, also referred to as a mobile device, based on the location of the mobile device. For example, a call initiated by an originating communications device, for example, a telephone, to a mobile device can be directed either to the mobile device or to one or more alternative communications devices, depending on the location of the mobile device.

The systems and methods include a localization system that is configured with a set of user-provided instructions regarding call delivery. In particular, the instructions include a set of conditions that define one or more destination addresses of an incoming call depending on the location of the mobile device and/or the condition of the mobile device. The localization system can be located in a communications network, for example a public switched telephone network (PSTN) and/or a cellular network, between the originating communications device, the mobile device, and/or the alternative communications device. Alternatively, the localization system can be positioned in a premises-based communications platform, for example, a private branch exchange (PBX), or configured in the mobile device.

Prior to use, the mobile device is registered with the localization system, and call delivery instructions are provided to the localization system. The instructions can include anticipated locations of the mobile device, and where incoming calls are to be delivered if the mobile device is in the proximity of the anticipated locations. The mobile device can also register with a location system, for example, at a location based service (LBS) or a presence server, and is configured to provide location information to the location system.

When a call is initiated by an originator telephone to the mobile device, the localization system identifies the incoming call as being directed to the mobile device. The localization system queries the location system or the mobile device for location information related to the mobile device, and compares the mobile device location information to the conditions included in the user instructions to determine a destination address to receive the incoming call. The destination address can be determined to be the mobile phone destination address, whereby the call delivery of the incoming call remains unchanged, i.e., the incoming call is directed to the destination address of the mobile phone. Alternatively, the destination address can be determined to be a local destination address, for example, to a guest room phone at a hotel where the mobile device is staying. Here, the incoming call can be redirected to the local destination address. Prior to receiving the call, a notification can be provided that identifies the mobile device user as the recipient of the incoming call. The calling party, i.e. the originating telephone caller, can be provided with a notification suggesting that the calling party wait for the called party, i.e., the mobile phone user, to answer the call should delays occur during delivery of the incoming call to the local destination address.

The systems and methods disclosed herein thereby permit an incoming call to be directed based on the user's location rather than the destination address identified by the originating communications device. The systems and methods disclosed herein can utilize any call delivery mechanism that may be included in the communications network. Incoming calls can be managed in a manner that allows a mobile phone user to reduce or avoid incurring toll or roaming charges. In addition, a user of the systems and methods disclosed herein is not required to carry a mobile device or maintain a service plan, but can provide instructions via an internet browser or other input device to redirect incoming calls from any communications device to one or more alternative communications devices determined by the user in accordance with rules or conditions established by the user.

Figure 2:
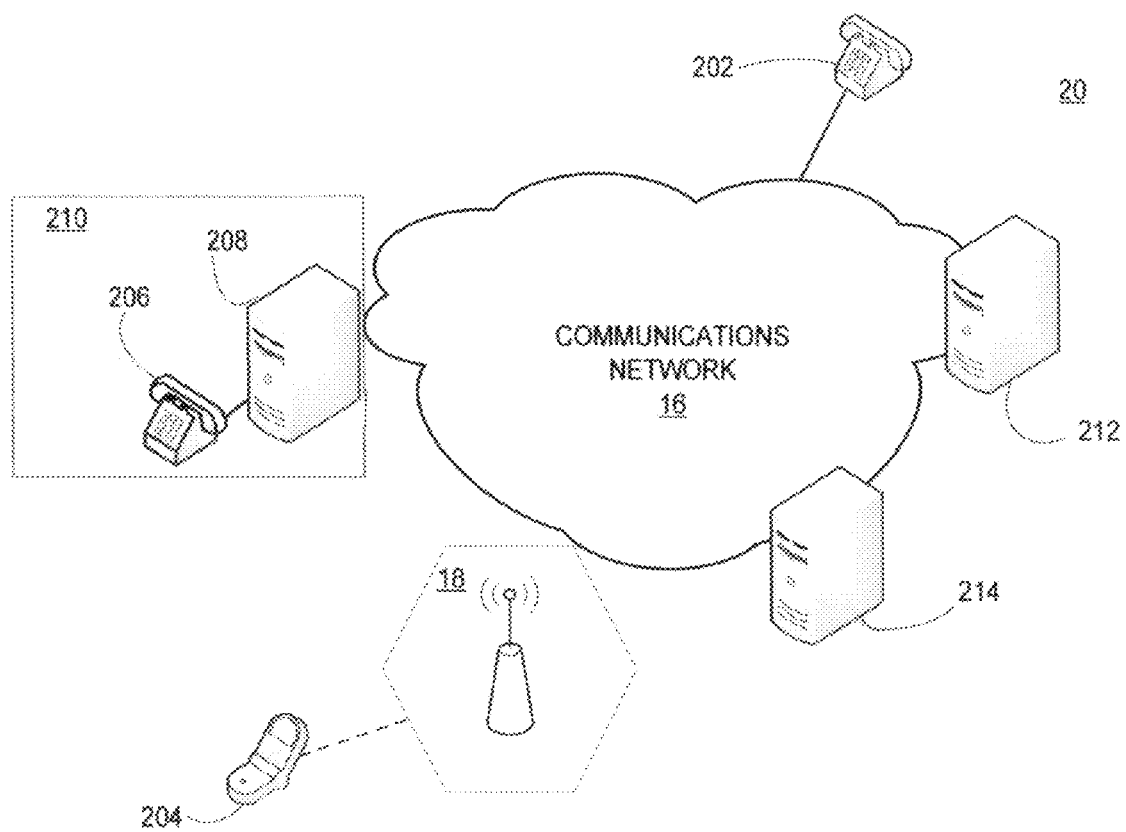
FIG. 2 is a schematic network diagram illustrating a communications environment in which embodiments of the present inventive concepts can be employed.

FIG. 2 is a schematic network diagram illustrating a communications environment 20 in which embodiments of the present inventive concepts can be employed. The communications environment 20 can include a telephone 206, referred to herein as an alternative telephone, at a location 210. The telephone 206 can place and receive calls via a communications network 16, for example, via a premises-based communications platform 208 such as a PBX. An originating telephone 202 and a mobile device 204 can also place and receive calls via the communications network 16. In FIG. 2, three telephones are shown, namely, the original telephone 202, the mobile device 204, and the alternative telephone 206. It will be appreciated that other communications devices can be connected to the communications platform 108, for example, personal digital assistants (PDAs), laptop computers, handheld computers, pagers, or other electronic devices.

The communications network 16 can include a cellular network 18, or other suitable network such as a local area network (LAN), a wide area network (WAN), a PSTN, a satellite network such as the Global Positioning System (GPS), or a combination thereof. A suitable network can be any network known to those of ordinary skill in the art as being capable of transmitting voice, data, and/or video between the originating telephone 202, the mobile device 204, the alternative telephone 206, and/or other communications devices located at local, nationwide, or international destinations. The communications network 16 can include one or more call delivery mechanisms known to those of ordinary skill in the art.

The network environment 20 includes a location system 214 that receives location information from the mobile device 204, for example, via a GPS system in the mobile device 204.

The location system 214 can be positioned at the communications network 16 as shown in FIG. 2. The location system 214 can be part of an LBS, real-time locating system (RTLS), GSM tracking system, Roadmap position tracking system, and the like. The location system 214 can include a presence server, which provides presence status information related to the availability of mobile device user.

In an embodiment, the location system 214 is positioned in the communications network 16. In another embodiment, at least one of the localization system 212 and the location system 214 is included in the communications platform 208. Here, the communications platform 208 can include a PBX or communications server, for example, Mitel® ICP 3300, and further include a call processor, for example, a Mitel® Communications Director (MCD), that communicate with the localization system 212 to manage incoming calls. The communications platform 208 can be configured to include telephony features known to those of ordinary skill in the art, for example, Dynamic Extension by Mitel Networks Corporation.

In another embodiment, the localization system 212 is included in the mobile device 204. Here, the mobile device 204 can receive call signaling information related to an incoming call, and redirect the incoming call to another destination depending on the conditions specified in the localization system 212. In an embodiment, the localization system 212 communicates with a mobile device 204 includes a Unified Communicator Advanced (UCA) mobile client by Mitel Networks Corporation. In an embodiment, the localization system 212 and the location system 214 are co-located on the same communications platform. The communications platform including the localization system 212 and the location system 214 can include hardware, software, firmware, or a combination thereof. The localization system 212 can communicate with network switching equipment, in particular, call delivery features of such equipment, to identify communications that are directed to the destination address of the mobile device 204, and to control the delivery of such communications to a destination address according to the location of the mobile device 204. The localization system 212 can be configured to interact and communicate with call processing features of the communications network 16 to direct calls to the mobile device 204, the alternative telephone 206, or other alternative destination addresses, for example, features such as call forward, call redirect, do not disturb, ring groups, and the like.

Figure 3:
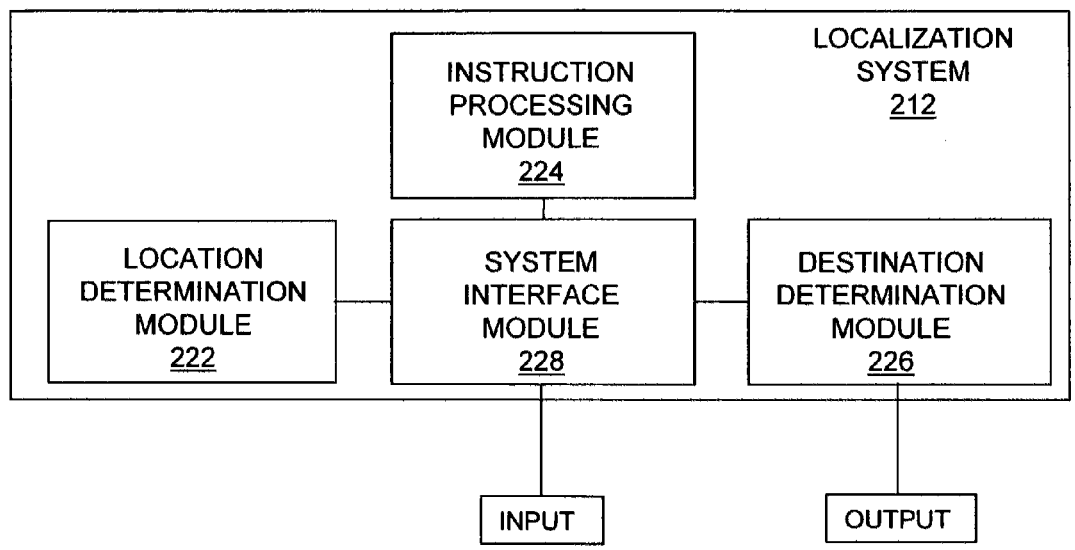
FIG. 3 is a block diagram of an embodiment of a localization system.

FIG. 3 is a block diagram of a localization system 212, in accordance with an embodiment. The localization system 212 comprises a location determination module 222, an instruction processing module 224, a destination determination module 226, and a system interface module 228. The localization system 212 can execute entirely on a computer, for example, a server, or some elements of the localization system 212, for example, the instruction processing module 224, can execute on a computer, while other elements, for example, the location information receiver 22, execute on a remote computer. The localization system 212 can include hardware, software, firmware, or a combination thereof.

The location determination module 222 is configured to communicate with the location system 214 via the system interface module 228 to receive and store information related to the location of the mobile device 204. Alternatively, the location determination module 222 can be configured to communicate with the mobile device 204, for example, to receive location information directly from the mobile device 204.

The instruction processing module 224 receives and stores one or more instructions defined by the mobile device user, network administrator, or other user. The instruction processing module 224 generates one or more conditions from each instruction, each condition defining a destination address that is to receive an incoming communication, depending on the location of the mobile device 204. A user can provide the instructions to the instruction processing module 224 by entering them into a user interface of the system interface module 228 via a web browser, telephone user interface (TUI), Interactive Voice Response (IVR) system, Speech Recognition system (SRS), call center or answering service, or other input mechanisms.

The destination determination module 226 identifies an incoming call by receiving information related to the incoming call, for example, from call control information provided by the communications network 16. The destination determination module 226 determines the destination address from information corresponding to the incoming call, and identifies the mobile device 204 from the destination address. The destination determination module compares the current location of the mobile device 204 stored in the location determination module 222 and the user-established conditions to determine a destination address for the incoming call. Based on this determination, the incoming call can be directed to the mobile device 204 or to one or more alternative communications devices, depending on the location of the mobile device 204.

Figure 4:
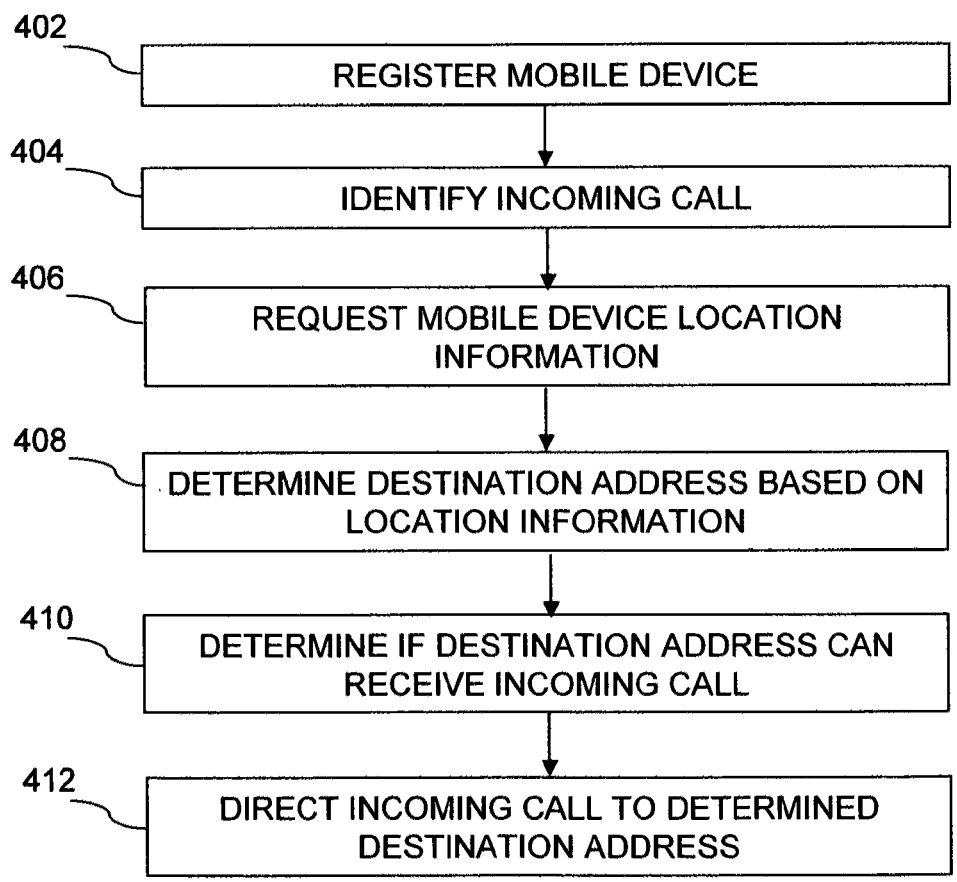
FIG. 4 is a flowchart of an embodiment of a method for managing calls initiated to a mobile communications device.

FIG. 4 is a flowchart of a method 400 for managing calls initiated to a mobile communications device, in accordance with an embodiment. Some or all of the method 400 can be implemented in the localization system 212 and/or the location system 214 described in FIGS. 2 and 3. Accordingly, in describing the method 400, reference is also made to FIGS. 2 and 3.

According to the method 400, the mobile device 204 registers 402 with at least one of the localization system 212 and the location system 214. The mobile device 204 can register with the location system 214 to periodically send information related to the location of the mobile device 204, for example, via GPS. The mobile device 204 can be configured to transmit location information to the location system 214 at predetermined time intervals. The mobile device 204 can alternatively be configured to transmit location information to the location system 214 at established distance intervals, for example, every 10 miles. The mobile device 204 can alternatively be configured to transmit location information to the location system 214 according to other predetermined criteria, for example, when the mobile device 204 is at the perimeter of a coverage area. In another embodiment, the location of the mobile device 204 is determined from non-GPS devices, for example, a proxy server, WiFi from the mobile device, or other location-determining devices.

The location information provided by the mobile device 204 to the location system 214 can include the destination address of the mobile device 204. The destination address can be a phone number, session initiation protocol (SIP) address, and the like, depending on the communications protocols relied on by the communications network 16, for example, a PSTN and/or a cellular network 18, which may be part of the communications network 16. The call can be a phone call, text message, or other real-time communication. The destination address can correspond to a communications device such as a telephone, mobile phone, personal digital assistants (PDA), laptop computer, handheld computer, pager, or other electronic device. The destination address can be statically or dynamically configured for one or more users according to individuals, organizations, affiliations, or other groupings, for example, a single phone pertaining to a corporate main number.

The mobile device 204 registers with the localization system 212, whereby the mobile device user, network administrator, or other user provides instructions to the localization system 212 as to where to direct an incoming call, depending on the location of the mobile device 204. An instruction can include a condition that identifies one or more destination addresses to receive an incoming call, and further defines the location of the mobile device 204 corresponding to the destination address. An instruction can identify multiple destination addresses to receive an incoming call, and in which order, for example, specified order or derived order, the destination addresses are to receive the call. For example, the instruction can identify a first destination address as being a hotel phone number, and if the incoming call is not answered by the hotel phone, then the incoming call is to be directed to a second destination address, for example, a home phone number. The instruction can also specify a number of simultaneous call attempts before redirecting an incoming call from the first destination address to a second destination address.

If the condition is satisfied, an incoming call is directed to the destination address identified in the condition. For example, an instruction can be defined so that incoming calls to the mobile device 204 are redirected to the alternative telephone 206 if the mobile device 204 is within 10 miles of the location 210 of the alternative telephone 206; otherwise, the call is to be directed to the mobile device 204. The mobile device user, system administrator, and the like can update a current set of instructions in the localization system 212 via the system interface module 228 of the localization system 212.

The instructions can also include information regarding anticipated mobile device locations, and destination addresses corresponding to these locations. For example, a mobile device user can provide a set of instructions to the localization system 212 pertaining to a travel itinerary. The instructions can establish that a hotel phone at a first travel destination is to receive incoming calls directed to the mobile device 204 if the mobile device 204 is within 10 miles of the first travel destination on a first day of a travel route, and that a hotel phone at a second travel destination is to receive incoming calls directed to the mobile device 204 if the mobile device 204 is within 10 miles of the second travel destination on a second day of the travel route.

When a call is initiated from the originating telephone 202, the localization system 212 identifies 404 the incoming call as being directed to the destination address of the mobile device 204, for example, by receiving a call request message from the originating telephone 202 or network elements of the communications network 16 receiving the incoming call request message.

The localization system 212 sends a request 406 to the location system 214 for information related to the location of the mobile device 204. The location system 214 responds to the request by providing the current location information of the mobile device 204. The location information can include the mobile device destination address, a GPS location of the mobile device 204, a Roadmap position, or other position and safety tracking data of the mobile device 204. The location information can include an estimated velocity that the mobile device 204 is traveling, a direction vector, and/or a duration of time since the location system 212 received a location update from the mobile device 204.

The localization system 212 determines 408 from the received location information a destination address for the incoming call from the originating telephone 202. For example, the localization system 212 determines whether to permit the incoming call from the originating telephone 202 to be directed to its intended destination address, i.e., mobile device 204, or whether the incoming call should be redirected to the alternative telephone 206, or other destination address such as a voicemail service or answering service. The localization system 212 determines the destination address where the incoming call is to be directed based on location of the mobile device 204, i.e., depending on whether the mobile device 204 is more than or less than 10 miles from the location 210.

The localization system 212 determines 410 if the destination address identified for the incoming call receives the call, or whether a call delivered to the mobile device 204 will fail, for example, due to insufficient range capacity or battery life. For example, if the localization system 212 determines that the mobile device 204 receives an incoming call, then the localization system 212 can also determine if the mobile device 204 is disabled, out-of-service, or otherwise unreachable. If a condition is established that the mobile device 204 is unreachable, for example, according to a predetermined number of call attempts specified in the instructions, then the localization system 212 refers to the instructions in the instruction processing module 224 to determine a next alternative destination address according to a specified order or derived order, for example, determined by time of day or other availability conditions such as presence. If the instructions do not include an alternative destination address, the localization system 212 can be configured with a default action to be performed. For example, an incoming call can be directed to a voicemail system or message service in accordance with the default action.

The incoming call is then directed 412 to the determined destination address according the location of the mobile device. The delivery of the incoming call can be subject to security mechanisms and or call filtering technologies, which can prevent the incoming call from being directed to the determined destination address, for example, to ensure privacy rights are respected and to prevent inappropriate calls. If the incoming call is prevented from being delivered to the determined destination address, the localization system 212 can determine a different destination address in accordance with user instructions provided to the localization system 212.

A call notification or alert can be provided to the alternative telephone 206 that identifies the mobile device user. Optionally, a notification can be provided to the originating telephone 202, for example, to inform the calling party that the call is proceeding. The notification or alert can be generated by the communications network 16 as is known to those of ordinary skill in the art. Notifications or alerts can be provided on the telephone display, include the playback of audio files or text to speech messages, and/or be generated as distinctive ring configurations, such as a short burst of rings, or different ring tones, as is known to those of ordinary skill in the art. Notifications or alerts can be provided to electronic devices other than the originating telephone 202, the mobile device 204, or the alternative telephone 206, for example, a visual display.

Figure 5:
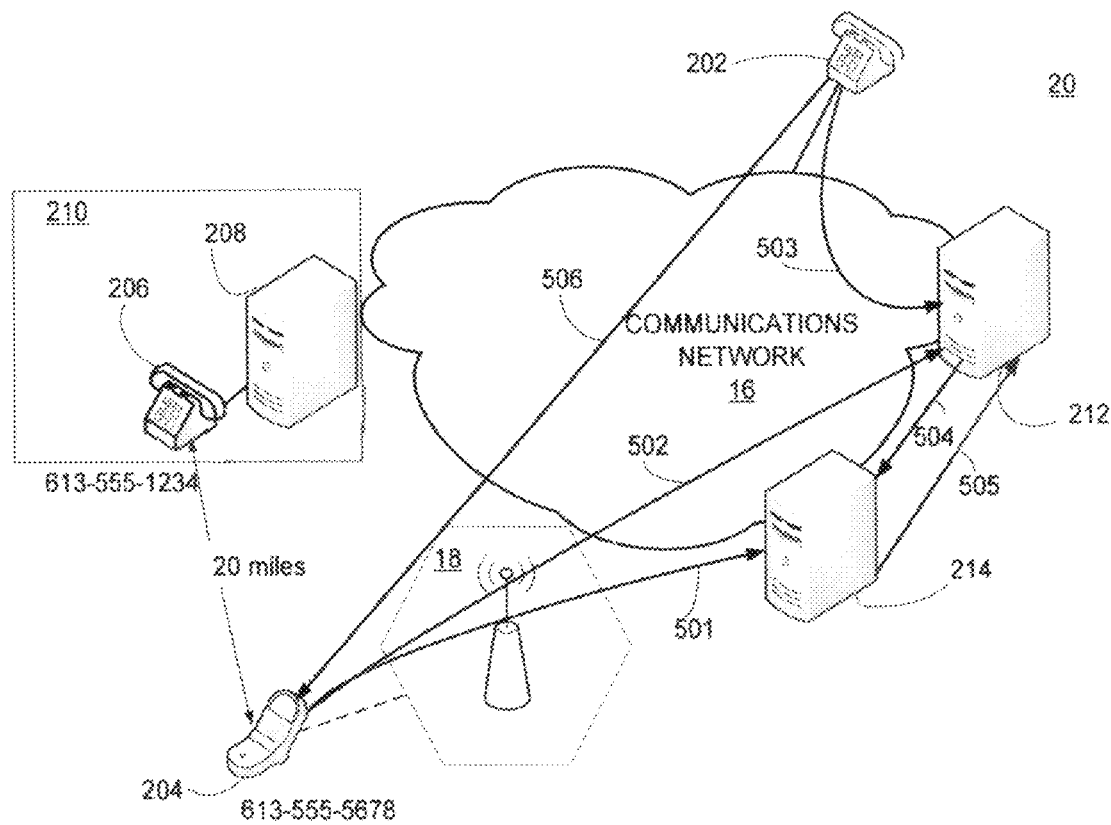
FIG. 5 is an illustration of call flow paths through the communications environment of FIG. 2, in accordance with an embodiment.

FIG. 5 is an illustration of call flow paths 501-506 through the communications environment 20 of FIG. 2, in accordance with an embodiment. In describing the call flow paths 501-506, reference is also made to FIGS. 2-4.

In this illustrative example, a mobile device user submits an instruction 502 to the localization system 212 that incoming calls to the mobile device 204 are to be directed to the destination address (613-555-1234) of the alternative telephone 206 at location 210 if the mobile device 204 is determined to be 10 miles or less from the location 210. Otherwise, if the mobile device 204 is determined to be more than 10 miles from the location 210, then the incoming calls are to be directed to the destination address (613-555-5678) of the mobile device 204. The instruction can also instruct calls to be redirected to a different destination address other than either the mobile device 204 or the alternative telephone 206, for example, to an office location, home, emergency contact, or voicemail system. The mobile device 204 also sends a notification 501 to the location system 214 that the mobile device 204 is 20 miles from the location 210.

A calling party initiates from an originating telephone 202 a call to the mobile device 204. The localization system 212 receives a control signal identifying 503 the call as being directed to the mobile device 204, for example, using telephone number mapping such as the Electronic Number Mapping System (ENUM), or other identification approach known to those of ordinary skill in the art. The localization system 212 sends a request 504 to the location system 214 for information related to the location of the mobile device 204. The location system 214 responds 505 to the request with location information related to the mobile device 204. In this example, the location system 214 informs that localization system 212 that the mobile device 204 is 20 miles from the location 210. The incoming call is directed 506 to the destination address of the mobile device 204 in accordance with the instruction provided to the localization system 212.

Figure 6:
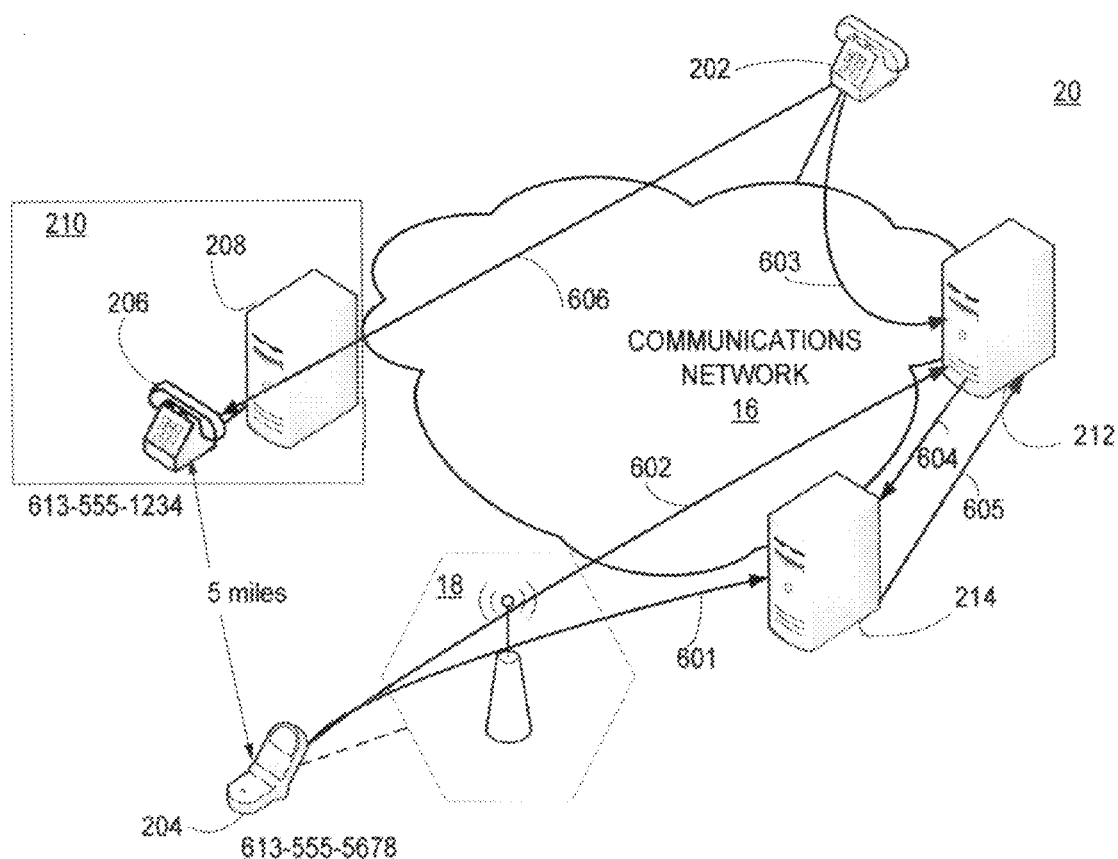
FIG. 6 is an illustration of call flow paths through the communications environment of FIG. 2, in accordance with another embodiment.

FIG. 6 is similar to FIG. 5 except that the mobile device 204 is determined to be 5 miles from the location 210. In this illustrative example, the instructions sent in call flow 602 to the localization system 212 are the same as those instructions provided in call flow 502. The mobile device 204 also sends a notification 601 to the location system 214 that it is currently located 5 miles from the location 210.

A calling party initiates from an originating telephone 202 a call to the mobile device 204. The localization system 212 receives a call control signal identifying 603 the call as being directed to the mobile device 204. The localization system 212 sends a request 604 to the location system 214 for information related to the location of the mobile device 204. The location system 214 responds 605 to the request with location information indicating that the mobile device 204 is 5 miles from the location 210. The localization system 212 is in communication with call control and signaling elements of the communications network 16, including the cellular network 18, for example, a redirect server, to redirect the incoming call to the destination address (613-555-5678) instead of the mobile device 204 (613-555-1234). The incoming call is then directed to the destination address (613-555-1234) of the alternative telephone 206. Accordingly, the incoming call is then directed 606 to the destination address of the alternative telephone 206, even though the call was initially directed to the mobile phone number. In addition, the calling party can receive a notification of the redirected call and/or a warning of possible toll charges.

The call flows shown in FIG. 6 can also apply in embodiments where the user is not carrying a mobile device when staying at the location 210 at the hotel. For example, a user's mobile device number can apply since the hotel is receiving a redirected call originally intended for the destination address of the mobile device 204. The call flows shown in FIG. 6 can also apply in embodiments where the user does not subscribe to a mobile phone service, and instead refers to a different destination address, for example, an office phone number. The localization system 212 can be configured to redirect calls initially placed to the office number to the alternative telephone 206, for example, a hotel room telephone.

In an embodiment, the communications platform 208 can be configured for Dynamic Extension, or similar feature. Here, an incoming call initiated to the mobile device 204 and redirected to the alternative telephone 206 enables the mobile device 204 to enjoy the benefits offered by a Dynamic Extension feature. For example, an employee of a company at location 210 has a corporate extension number, 613-555-1212×5353, which is associated with his mobile device using a Dynamic Extension feature. An incoming call to the employee's corporate extension number, i.e., 613-555-1212×5353, can be received by the employee at the appropriate designation address based on the employee's current location as determined by the localization server 212.

Figure 7:
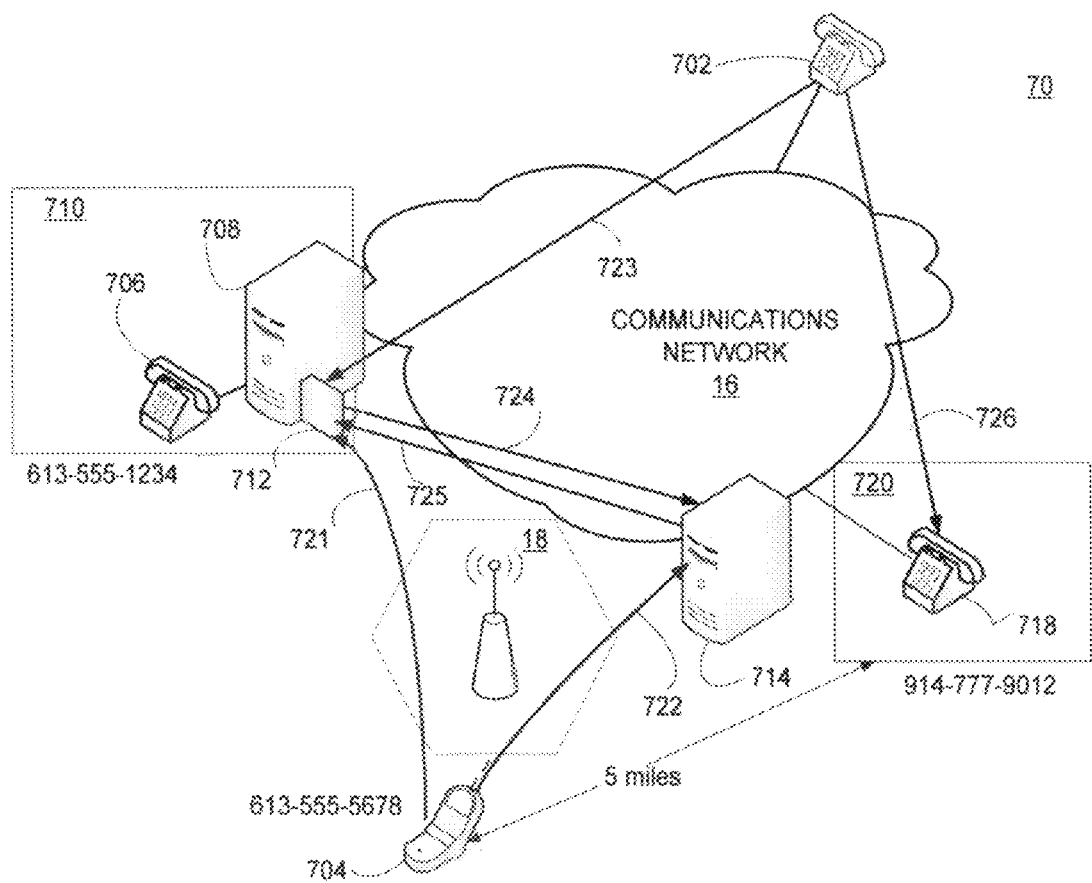
FIG. 7 is an illustration of call flow paths through a network environment, wherein a localization server is located on a premises-based communications platform, in accordance with an embodiment.

FIG. 7 is an illustration of call flow paths 721-726 through a network environment 70 wherein a localization server 712 is located on a premises-based communications platform 708 at a location 710, in accordance with an embodiment. In describing the call flow paths 721-726, reference is also made to FIGS. 2-4.

A user submits instructions 721 to the localization system 712 that incoming calls to a destination address (613-555-1234) mobile device 704 are instead to be directed to the destination address (514-777-9012) of a telephone 718 at location 720 if the mobile device 704 is determined to be 10 miles or less from the location 210. The localization system 712 is located on a premises-based communications platform 708 at a location 710, for example, a Mitel® 3300 ICP.

The mobile device 704 also sends a notification 722 to the location system 714 that the mobile device 704 is 5 miles from the location 720. The location system 714 can be co-located with the localization system 712 on the communications platform 708, or as shown in FIG. 7, can be positioned in the communications network 16. The location system 714 can include a presence server, which provides presence status information related to the availability of mobile device user.

A calling party initiates from an originating telephone 702 a call to the mobile device 704. The localization system 712 identifies 723 the call as being directed to the mobile device 704, and sends a request 724 to the location system 714 for information related to the location of the mobile device 704. The location system 714 responds 725 to the request with location information related to the mobile device 704. In this example, the location system 714 informs the localization system 712 that the mobile device 704 is 5 miles from the location 720. In response, the incoming call from the originating telephone 702 is directed 726 to the location 720.

Figure 8:
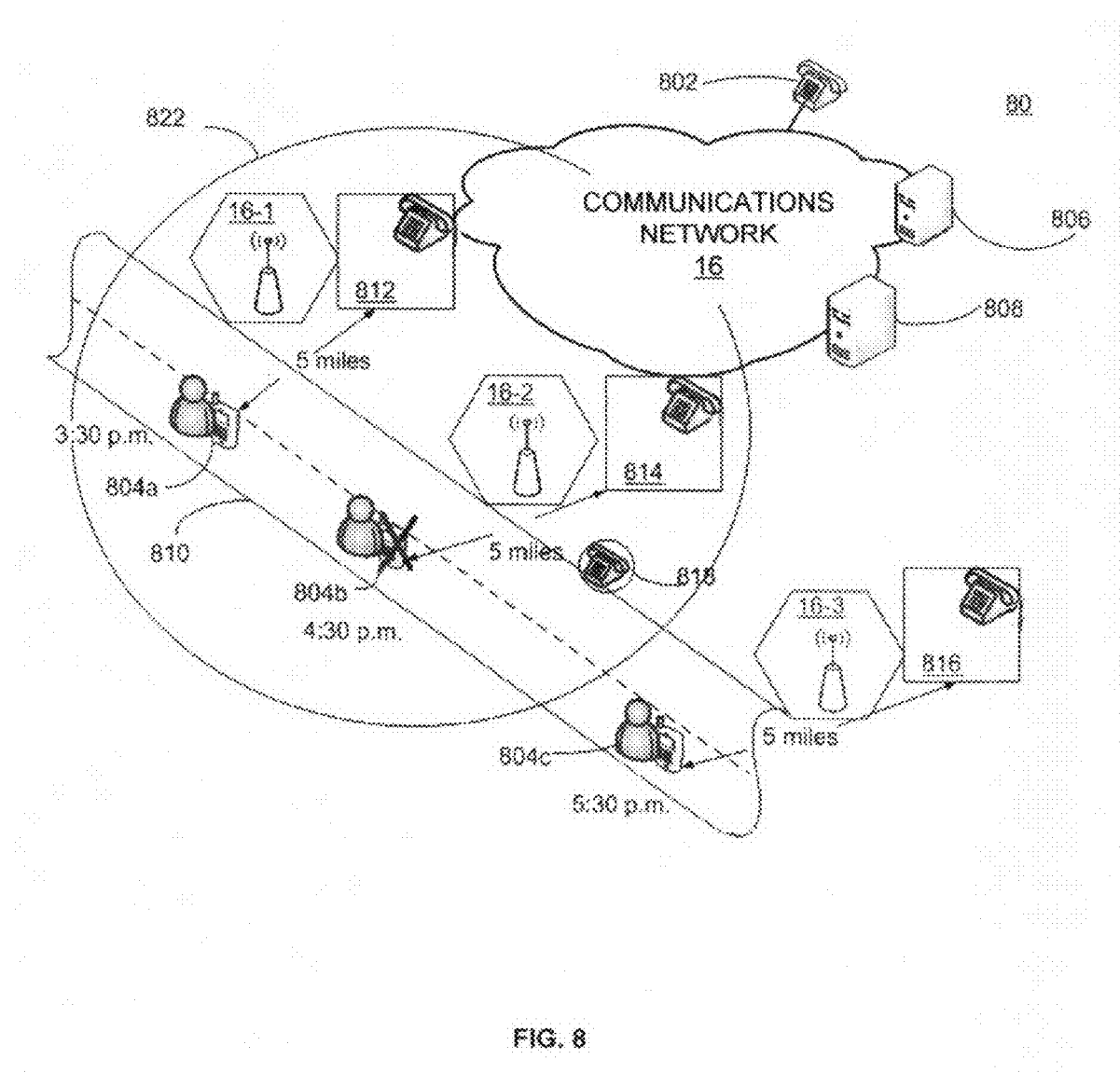
FIG. 8 is a schematic network diagram illustrating another communications environment in which embodiments of the present inventive concepts can be employed.

FIG. 8 is a schematic network diagram illustrating another communications environment 80 in which embodiments of the present inventive concepts can be employed. The communications environment 80 can be similar to the communications environment 20 described above.

In this example, a mobile device user travels along a travel route 810 with a mobile device 804, which is also referred to as mobile device 804a, 804b, or 804c, depending on its location along the travel route 810. The mobile device user submits information to a localization system 806 regarding its itinerary. This information includes instructions that incoming calls to the mobile device 804 are to be directed to the mobile device 804 if the mobile device 804 is in a coverage area 822 offered by the mobile phone service provider. The instructions further provide a condition that if the mobile device 804 is not in the coverage area 822, then incoming calls are to be redirected to alternative phone numbers at locations 812, 814, 816 along the travel route 810, depending on the time the incoming call is placed, and depending on the location of the mobile device 804.

In addition, the instructions can indicate that if the mobile device 804 is in a coverage area but cannot be reached, for example, the mobile phone is powered down or out-of-service, then incoming calls are to be redirected to emergency phone pedestals along the travel route 810, for example, emergency phone pedestal 824.

The mobile device 804 can provide location information to a location system 808. This information can include a GPS location, Roadmap position or other position and safety tracking data, estimated velocity, direction vector, duration since the last location update, and the like. This can be used to determine which alternative phone to call along the route, depending on the location of the mobile device 804.

In a first example, at 3:30 p.m., the mobile device 804a is in its coverage area 822, and is 5 miles from the first location 812. The mobile device 804a provides this location information to the location system 808, as well as other location information such as the longitude and latitude of the mobile device 804, an estimated velocity of the mobile device 804, direction of travel, during of time since a last location update, and the like.

A call is initiated from an originating telephone 802 to the mobile device 804a. The location system 808 provides the location information to the localization system 806, which compares the location information to the conditions provided by the mobile device user, and determines that the incoming call from originating telephone 802 can be delivered to the mobile device 804a. The incoming call is then delivered to the mobile device 804a via a cellular network 16-1, which is part of the communications network 16.

In a second example, at 4:30 p.m., the mobile device 804b is located in its coverage area 822, and is 5 miles from the second location 814. The mobile device 804b is powered down due to an insufficient battery charge.

A call is initiated from an originating telephone 802 to the mobile device 804b. The localization system 806 identifies the incoming call, and requests location information related to the mobile device 804b. The location system 808 provides the location information to the localization system 806, which compares the location information to the conditions provided by the mobile device user, and determines that the incoming call can be delivered to the mobile device 804b. An attempted call delivery is made to the mobile device 804b via a cellular network 16-2, which is part of the communications network 16.

In this example, the call delivery fails because the mobile device 804b is powered down. Accordingly, the localization system 806 receives a message of the failed call delivery. The localization system refers to the instructions provided by the mobile device user, and redirects the incoming call to an alternative destination address, which according to the instructions is the emergency phone 818. The mobile device user can be informed of the incoming call to the emergency phone 818, for example, by a flashing indication on the emergency phone 818. The localization system 806 can be configured to instruct the emergency phone 818 to provide distinctive rings and/or a flashing indication, for example, a series of rings each having a short duration.

If the mobile device user does not answer the emergency phone 818, the incoming call can be redirected to a different destination, for example, to the second location telephone 814, depending on the instructions.

In a third example, at 5:30 p.m., the mobile device 804c is located outside the coverage area 822, and is 5 miles from the third location 816. The mobile device 804c provides this location information to the location system 808, for example, via a cellular network 16-3. A call is initiated from the originating telephone 802 to the mobile device 804c. The location system 808 provides the location information to the localization system 806, which compares the location information to the conditions provided by the mobile device user, and determines that the incoming call from originating telephone 802 can be directed to a destination address at the third location 816 in accordance with the instruction. The incoming call is then delivered to the third location 816 via the communications network 16.

While many of the specific examples herein refer to the use of mobile devices by business travelers, the systems and methods disclosed herein can also be applied to any person who may need to be reached, regardless of whether a mobile communication service is available to the person. For example, a medical specialist may be employed by one or more hospitals, which have equipment that are sensitive to interference caused by mobile device use.

While the invention has been shown and described with reference to specific embodiments, it should be understood by those skilled in the art that various changes in form and detail may be made therein without departing from the spirit and scope of the invention as recited in the accompanying claims.

What is claimed is:

1. A computer-implemented method, having instructions stored on a tangible and non-transitory medium, of managing a real-time communication initiated to a mobile communications device based on a user's mobile communications device physical location, comprising:
   sensing a communication from an originating communications device that is directed to a first destination address corresponding to the user's mobile communications device;
   determining location information related to the mobile communications device;
   receiving an instruction from the user that defines a future travel itinerary comprising at least one travel destination having a second destination address, the second destination address to receive an incoming communication directed to the first destination address when the mobile communications device is a predetermined distance from the determined location or within a predetermined distance of the at least one travel destination and the second destination address is a different destination address than the first destination address;
   comparing the location information and the instruction to determine if the communication is to be directed to the second destination address;
   directing the communication to the second destination address based on the comparison and the determined location of the mobile communications device;
   generating a notification to the second destination address prior to delivery of the incoming communication that identifies a user of the incoming communication;
   generating a notification to the originating communications device of the communication directed to the second destination address;
   determining if the communication is delivered to the second destination address;
   comparing the location information and the instruction to determine a third destination address if the communication fails to be delivered to the second destination address; and directing the communication to the third destination address in response to the comparison.

2. The method of claim 1, wherein the information related to the location of the mobile communications device includes at least one of a Global Positioning System (GPS) location of the mobile phone, a Roadmap position, an estimated velocity, a direction vector, and a duration of time since the location of the mobile communications device was last determined.

3. A method of managing a call initiated to a mobile communications device based on the physical location of the device, comprising:
  providing an instruction to a localization system that includes a condition comprising a future travel itinerary having at least one travel destination, the travel destination defining at least one destination address to receive an incoming call when a mobile communications device is a predetermined distance from a location or within a predetermined distance of the at least one travel destination;
  providing a location system with location information related to the mobile communications device;
  sensing by the localization system the incoming call initiated from an originating communications device that is directed to a first destination address corresponding to a mobile communications device;
  determining by the localization system the second destination address by comparing the location information and the condition, the second destination address is a different destination address than the first destination address;
  directing the incoming call to the second destination address in response to the comparison and the location of the mobile communications device;
  generating a notification to the second destination address prior to delivery of the incoming call that identifies a user of the call;
  generating a notification to an originating communications device of the incoming communication that the incoming call is directed to the second destination address;
  determining if the communication is delivered to the second destination address;
  comparing the location information and the instruction to determine a third destination address if the communication fails to be delivered to the second destination address; and
  directing the communication to the third destination address in response to the comparison.

4. The method of claim 3, wherein the information related to the location of the mobile communications device includes at least one of a GPS location of the mobile phone, Roadmap position, an estimated velocity, a direction vector, and a duration of time since the location of the mobile communications device was last determined.

5. A premises-based localization device, comprising:
  a location determination module that receives and stores information related to a physical location of a mobile communications device, the information includes at least one of a Global Positioning System (GPS) location of the mobile phone, a Roadmap position, an estimated velocity, a direction vector, and a duration of time since the location of the mobile communications device was last determined;
  an instruction processing module that stores a condition comprising a future travel itinerary having at least one travel destination, the travel destination defining a destination address to receive an incoming communication if the mobile communications device is a predetermined distance from the location or within a predetermined distance of the at least one travel destination;
  a destination determination module that compares the information related to the physical location of the mobile communications device and the condition, and directs the incoming communication to the destination address, determining if the communication is delivered to the destination address which is different than the physical location of the mobile communications device, in response to the comparison and the location of the mobile communications device;
  wherein the device generates a notification to an originating communications device of the incoming communication that the incoming call is directed to the second destination address and prior to the delivery of the communication, a notification to the destination address to identify a user of the incoming communication,
  and further wherein comparing the location information and the instruction to determine a third destination address if the incoming call is determined to failed to be delivered to the second destination address, and if failed, directing the incoming call to the third destination address.

6. The localization device of claim 5, wherein the destination determination module further determines if the incoming communication is delivered to the destination address and directs the incoming communication to a different destination address if the incoming communication fails to be delivered to the destination address.

7. The localization device of claim 5, wherein the localization device is a network-based localization device.

* * * * *